UNITED STATES PATENT OFFICE.

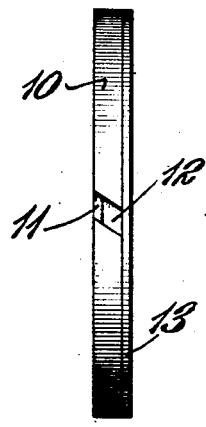 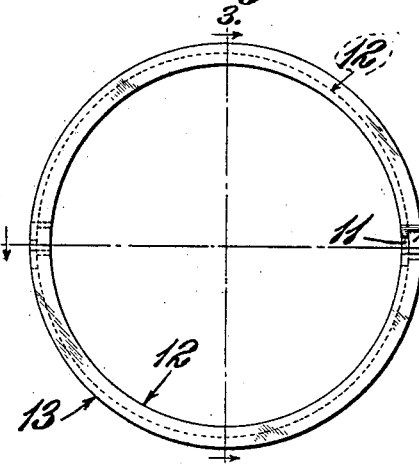 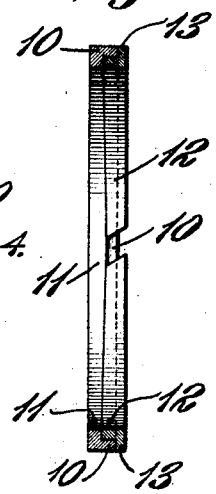
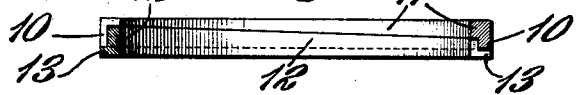
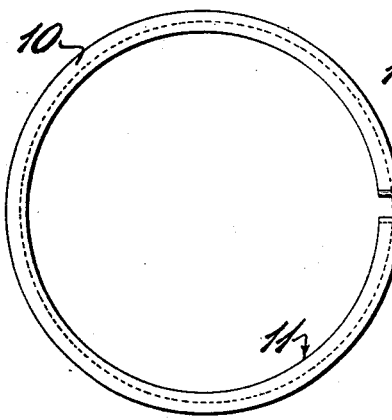 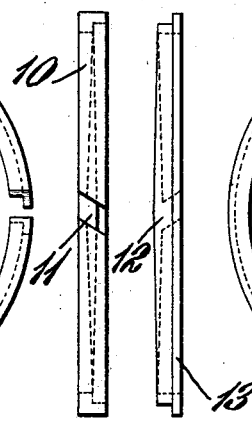 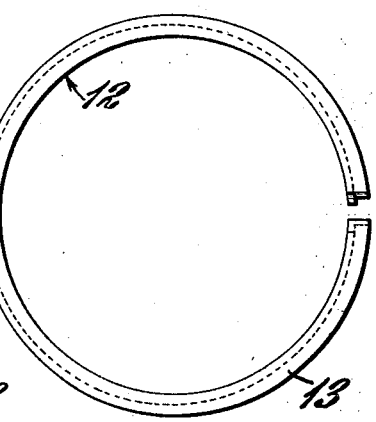 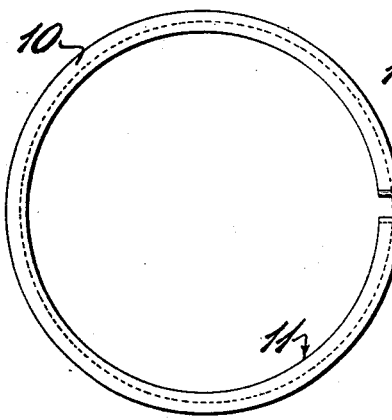

EUGENE F. COOK, OF ST. LOUIS, MISSOURI, ASSIGNOR TO OTTO F. STIFEL, OF ST. LOUIS, MISSOURI.

PISTON PACKING-RING.

1,220,153.  Specification of Letters Patent.  Patented Mar. 20, 1917.

Application filed May 8, 1916. Serial No. 95,998.

*To all whom it may concern:*

Be it known that I, EUGENE F. COOK, a citizen of the United States, and a resident of the city of St. Louis and State of Missouri, have invented new and useful Improvements in Piston Packing-Rings, of which the following is a specification.

This invention relates to metallic piston packing of the type which consists of an elastic ring adapted to be arranged in a circumferential groove in the piston of a reciprocating engine, pump, air compressor, or the like. The invention relates to two-piece piston rings, and particularly to the form which consists of two split rings arranged one within the other with the split in one ring diametrically opposite the split in the other, the inner ring being compressed within the outer and pressing it outwardly against the cylinder wall.

The object of the invention is a piston ring of the type referred to above having a uniform bearing against the cylinder wall and so shaped as to retain its two parts in their proper relative angular position without pins or shoulders, or other devices which weaken the rings or produce sudden changes in their cross-sectional shape or area.

The invention consists in making the two rings eccentric on their circumferentially contacting surfaces, and in providing each ring with a concentric flange on one edge for contacting against the groove in the piston and covering the unflanged edge of the other. The invention further consists in tapering off the ends of the inner ring upon the inner or unflanged edge and widening the flange of the outer ring on the inner side to conform to the taper of the ends of the inner ring and fit snugly against them.

Further objects and details of the invention are set forth in connection with the following description of the piston ring shown in the accompanying drawings, and what the invention consists in is more particularly pointed out in the appended claims.

In the drawings, in which the same reference characters designate the same parts in the several views, Figure 1 is a side view of an assembled piston ring embodying the invention;

Fig. 2 is an edge view of the same;

Figs. 3 and 4 are cross-sectional views of the assembled ring shown in Figs. 1 and 2, on the lines 3—3 and 4—4, respectively, in Fig. 2;

Figs. 5 and 6 are an edge view and a side view, respectively, of the outer split ring; and Figs. 7 and 8 are a side view and an edge view, respectively, of the inner split ring.

Figs. 6 and 7 show the two split rings separated, but in the same relative angular position as in Fig. 1.

As shown in the drawings, the split rings are in their free uncompressed condition with their ends separated by a considerable space. Their condition in use differs from that shown in that they are compressed within the walls of the engine cylinder to the point where their ends nearly touch, and hence have a tendency to expand to the free position which causes them to press radially outward against the walls of the cylinder in which they are confined.

The outer split ring 10 is of uniform width, and has an inwardly projecting flange 11 at one edge for its entire length, the inner and outer peripheries of the flanged edge being concentric. The width of the flange 11 and the thickness of the body portion of the ring 10 both vary uniformly from midway of the length of the ring to its two ends, being narrower and thinner at the ends than at the middle.

The inner split ring 12 has an outwardly projecting flange 13 at one edge for its entire length, the inner and outer peripheries of the flanged edge being concentric, and being of the same diameter as the inner and outer peripheries of the flanged edge of the ring 10. The flange 13 is of uniform width for its entire length, and it lies alongside of the unflanged edge of the outer ring, the outer edges of the flanges 11 and 13 being in parallel planes. The inner split ring 12 varies uniformly in thickness and in width from midway of its length to its ends, being thinner and narrower at the ends than at the middle. The change in width and thickness of the inner ring 12 conforms to the change in width of the flange 11 and the change in thickness of the outer ring 10, the two rings fitting each other exactly when arranged with their ends diametrically opposite each other.

From the foregoing description, it is evident that both split rings have tapering ends, the decrease in size being uniform from the middle to each end, and the stiffer middle portion of the inner ring being arranged within the more flexible ends of the outer ring to support them and equalize the pressure of all parts of the outer ring against the cylinder wall. The sidewise tapering inner ring fits against the sidewise tapering flange of the outer ring and thereby prevents angular displacement of the two rings when they are confined in the groove of a piston.

What I claim as my invention and desire to secure by Letters Patent is:

1. A packing ring comprising two split rings arranged one within the other with their ends diametrically opposite each other, the ends of the inner ring being tapered sidewise, an inner flange on one edge of the outer ring, said flange tapering in width from midway of the length of said outer ring to its ends, and an outer flange on the edge of the inner ring opposite said inner flange, said flanges bearing against the unflanged edges of said rings respectively.

2. A packing ring comprising two split rings arranged one within the other with their ends diametrically opposite each other, the ends of each ring being tapered in thickness and the ends of one of said rings being tapered sidewise, an inner flange on one edge of the outer ring, and an outer flange on the edge of the inner ring opposite said inner flange, one of said flanges tapering in width from midway of its length to its ends and contacting sidewise against the unflanged edge of said sidewise tapering ring.

Signed at St. Louis, Missouri, this fourth day of May, 1916.

EUGENE F. COOK.